(No Model.)
P. PATTERSON.
PIPE JOINT.
No. 323,956. Patented Aug. 11, 1885.
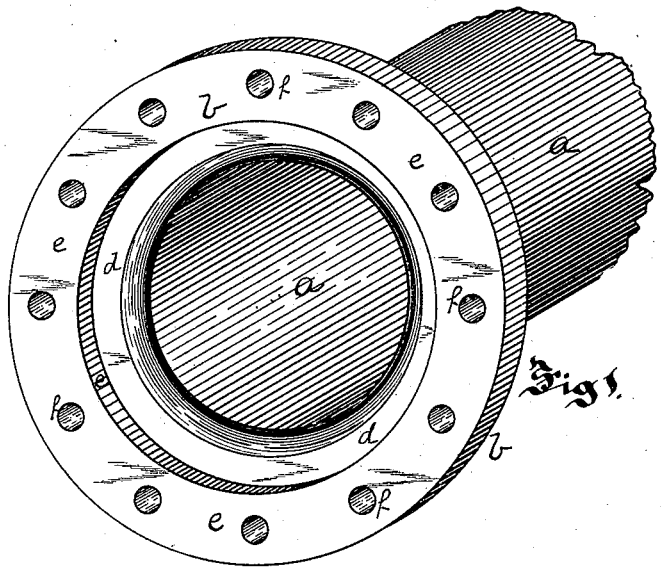
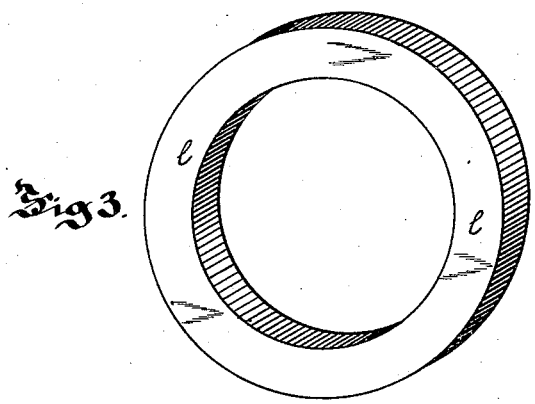
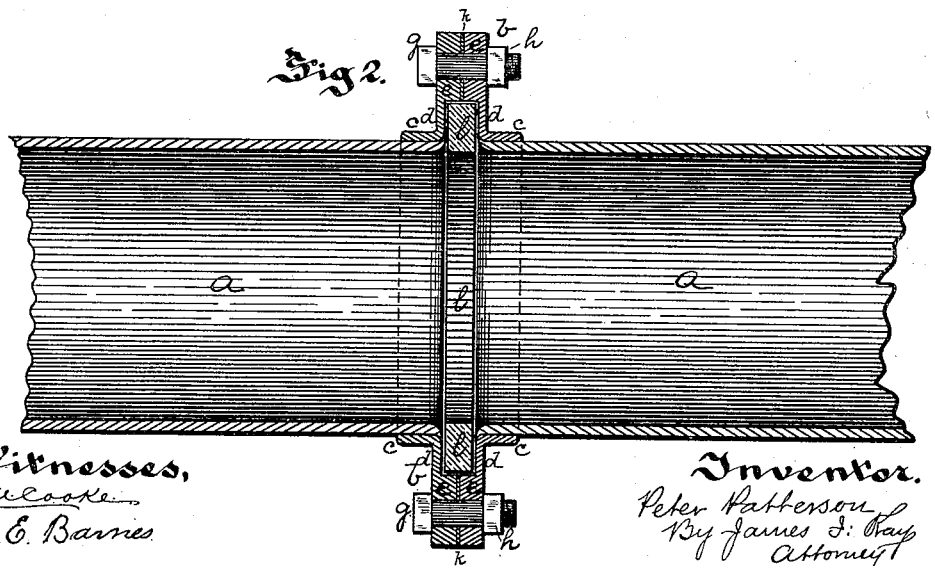
Witnesses,
Ju Cooke
J. E. Barnes.
Inventor.
Peter Patterson
By James F. Ray
Attorney

UNITED STATES PATENT OFFICE.

PETER PATTERSON, OF McKEESPORT, PENNSYLVANIA, ASSIGNOR TO THE NATIONAL TUBE WORKS COMPANY, OF SAME PLACE.

PIPE-JOINT.

SPECIFICATION forming part of Letters Patent No. 323,956, dated August 11, 1885.

Application filed April 17, 1885. (No model.)

*To all whom it may concern:*

Be it known that I, PETER PATTERSON, of McKeesport, in the county of Allegheny and State of Pennsylvania, have invented a new and useful Improvement in Tube-Joints; and I do hereby declare the following to be a full, clear, and exact description thereof.

My invention relates to joints or couplings for wrought-metal tubing, its object being to provide a joint which will allow of expansion and contraction of each section of the tubing independently, and will also form a gas-tight joint suitable for use in conduits for natural and other gas.

In the gas-conduits heretofore employed it has been found that where the joint or coupling was tight when made, on account of the varying pressure of the gas flowing through the tubing and because the natural gas has a very low temperature, (its average temperature being about 40° Fahrenheit, and varying according to the pressure within the conduit,) the expansion and contraction of the tubing will soon cause the stripping of the threads in the ordinary threaded joint, and will so form leaks, allowing of the escape of gas, and this has been the cause of numerous explosions in connection with the conveyance of this fluid. This has not been overcome by the employment of the ordinary expansion-joint, for the reason that the earth packed around the joints or couplings of the conduit prevents the movement of the tubing, and even where these expansion-joints are employed serious accidents have occurred on account of the explosion of gas. The tubing forming the conduits is generally made in sections of from sixteen to eighteen feet in length, and the expansion and contraction in each of these sections is of course very slight, but where a few sections of tubing will move under this force the strain of the expansion and contraction of these sections is brought upon some special joint, and thus causes the stripping of the threads therein.

By my invention I provide means for allowing the expansion and contraction of each separate section of tubing, and consequently prevent any great strain being brought upon any particular joint—each joint providing for the expansion and contraction of the sections of tubing connected by it.

My invention consists, essentially, in combining with wrought-metal tubing wrought-metal connecting flanges, having annular rings welded to the tubing and thin portions extending out from these rings, the welded joints between the tubing and flanges enabling me to form a joint with but one opening through which leakage might occur, and the thin portions of the flanges yielding upon longitudinal strain, thus providing in each joint for the expansion and contraction of the particular sections of tubing connected thereby, so that even where the joint is held from movement by the surrounding earth there is no liability of the opening of the joint or formation of leaks by the expansion and contraction of the tubing.

It also consists in certain details of construction as hereinafter specifically set forth.

In the accompanying drawings, Figure 1 is a perspective view of the end of a section of tubing having the flange forming part of the joint secured thereto. Fig. 2 is a longitudinal central section of my improved joint; and Fig. 3 is a perspective view of the ring employed within the joint, as hereinafter referred to.

Like letters of reference indicate like parts in each.

The tube-sections *a a* are the ordinary wrought-metal tubing usually employed for gas and other conduits. At the ends of each tube-section are welded the flanges *b*, each flange *b* having the annular lip *c* corresponding in inner diameter to the outer diameter of the tubing and welded thereto in any suitable way. By welding the flanges to the tubing I obtain absolutely gas-tight connections between them, so that they form practically part of each other, and therefore I obtain a tube-joint having but one opening through which there might be any liability of leakage—namely, between the faces of the two flanges where they are bolted or otherwise connected together, as hereinafter described. Extending around the annular ring *c* is the thin portion *d*, which extends out radially from said ring, and at the end of which is the thick body $e$ of the flange $b$, by means of which it is secured to the flange at the end of the adjoining section. In the construction preferred by me, as illustrated in the drawings, this thickened body extends in front of the thin portion $d$, as it can be more easily constructed in this form. The flanges $b$ may be secured together by any suitable means, that preferred being by bolting, as illustrated in the drawings, the bolt-holes $f$ extending through the body $e$ of the flange and the bolts $g$ passing through said holes and being secured by nuts $h$.

In order to form a gas-tight joint between the faces of the flanges these faces are dressed or planed true and smooth by any suitable means, and a suitable metallic packing, $k$, is employed between these dressed faces, the packing preferably used being a copper ring, which is clamped firmly between the faces of the flanges, thus forming an absolutely tight joint. As the body $e$ of the flanges extends out in front of the thin portion $d$ thereof, it is evident that a large space will be made within the conduit at the joint, and that such space will be liable to cause the formation of swells or cross-currents in the gas or other fluid carried through the conduit, thus creating friction, and in order to make the inner surface of the conduit substantially the same diameter I employ the ring $l$, which fits loosely within the joint in the space between the thin portions $d$, as shown, the inner face of this ring corresponding in diameter to the inner walls of the tubing. This ring fits loosely within the joint, and is simply employed to fill the space between the thin portions of the flanges—it not adding in any way to the strength of the joint. When the joint is formed, the ring $l$ is inserted, the packing-ring $k$ placed between the faces of the flanges to be connected, and the flanges secured together by bolts or otherwise, as before referred to—the faces of the flanges being clamped upon the packing-ring $k$, and thus forming a tight joint. The thin portions $d$ of the flanges are sufficiently strong to withstand the pressure to which the conduit is subjected, being generally made of about the thickness of the body of the tubing, but as these thin portions extend out beyond the body of the tubing, it is evident that any longitudinal or drawing strain consequent upon the expansion and contraction of the tubing is brought directly upon these thin portions $d$, and as they are free to yield or spring upon this drawing strain they will give sufficiently to allow of the expansion and contraction of the metal in the tube-sections and flange—in this way providing for all expansion or contraction in a single section of tubing, though of course they would not be sufficient to allow of any great longitudinal movement of the tubing. As, however, the expansion in the ordinary section of tubing is not over one-sixteenth of an inch, and as this is distributed over two joints, it is evident that this thin portion will yield sufficiently to take up this amount of strain without throwing any strain either upon the body of the tubing or upon the joint connecting the two tube-sections, and I thus obtain in each joint a yielding portion, which will allow of the expansion and contraction of the tubing, even though the joints connecting the tube-sections are held by the earth packed around them from any movement whatever, and by providing for the expansion and contraction in each joint connecting the sections of tubing prevent any heavy strain being brought upon any particular joint of the conduit or line of pipe, and in such way insure a perfectly gas-tight conduit.

I am aware that pipe-joints for cast-metal tubing have been formed of thin and yielding plates bolted to the flanges of the tubing and to each other through an interposed cast-metal ring, and hence do not claim, broadly, any tube-joint having a yielding plate therein; but in that construction there was great liability of leakage between the plates and tubing and plates and interposed ring, so that it would not be suitable for joints employed in gas-conduits. By my invention all the advantages of this joint are obtained for wrought-metal tubing, and the liability of leakage in the joint is reduced to a minimum, the flanges being welded to the tubing and the joint between the flange-faces being properly packed.

What I claim as my invention, and desire to secure by Letters Patent, is—

1. In combination with wrought-metal tubing, the wrought-metal connecting-flanges welded thereto, and having the thin yielding portion $d$ therein, substantially as and for the purposes set forth.

2. In combination with wrought-metal tubing, the wrought-metal connecting-flanges, each provided with the annular lip $c$, welded to the tubing, the thick body $e$, and the thin yielding portion $d$, between the body and lip, substantially as and for the purposes set forth.

3. In combination with wrought-metal tubing, the wrought-metal connecting-flanges, each provided with the annular lip $c$, welded to the tubing, the thin yielding portion $d$, and the thick body $e$, extending in front of said thin portion, and the ring $l$, fitting between said thin portions $d$ within the joint, substantially as and for the purposes set forth.

In testimony whereof I, the said PETER PATTERSON, have hereunto set my hand.

PETER PATTERSON.

Witnesses:
JAMES J. BOAX,
GEORGE MARS.